(12) United States Patent
Liu et al.

(10) Patent No.: US 10,185,169 B2
(45) Date of Patent: Jan. 22, 2019

(54) ELECTRODE LAYER, TOUCH PANEL, AND DISPLAY APPARATUS

(71) Applicants: BOE TECHNOLOGY GROUP CO., LTD., Beijing (CN); HEFEI BOE OPTOELECTRONICS TECHNOLOGY CO., LTD., Hefei (CN)

(72) Inventors: Bo Liu, Beijing (CN); Xianjie Shao, Beijing (CN); Honggang Gu, Beijing (CN); Long Xia, Beijing (CN); Wei Xue, Beijing (CN)

(73) Assignees: BOE TECHNOLOGY GROUP CO., LTD., Beijing (CN); HEFEI BOE OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 15/327,562

(22) PCT Filed: May 20, 2016

(86) PCT No.: PCT/CN2016/082896
§ 371 (c)(1),
(2) Date: Jan. 19, 2017

(87) PCT Pub. No.: WO2017/088387
PCT Pub. Date: Jun. 1, 2017

(65) Prior Publication Data
US 2018/0252954 A1  Sep. 6, 2018

(30) Foreign Application Priority Data

Nov. 27, 2015 (CN) .......................... 2015 1 0850276

(51) Int. Cl.
*G02F 1/133* (2006.01)
*G02F 1/1333* (2006.01)
(Continued)

(52) U.S. Cl.
CPC ........ *G02F 1/13338* (2013.01); *G02F 1/1343* (2013.01); *G02F 1/133528* (2013.01); *G02F 1/133603* (2013.01); *G06F 3/0416* (2013.01)

(58) Field of Classification Search
CPC .. G06F 3/0416; G02F 1/1343; G02F 1/13338; G02F 1/133603; G02F 1/133528
See application file for complete search history.

(56) References Cited

U.S. PATENT DOCUMENTS 10,073,554 B2   9/2018  Fan et al.
10,139,967      11/2018 Hao et al.
(Continued)

FOREIGN PATENT DOCUMENTS

CN   101566893 A   10/2009
CN   202815806 U    3/2013
CN   105117091 A   12/2015

OTHER PUBLICATIONS

1st Office Action dated Sep. 21, 2017 in 201510850276.3.
(Continued)

*Primary Examiner* — Muhammad N Edun
(74) *Attorney, Agent, or Firm* — Syncoda LLC; Feng Ma; Junjie Feng

(57) ABSTRACT

A touch-control panel of a display apparatus includes one or more electrode layers. The electrode layer includes: a plurality of first electrode strips; and a plurality of second electrode strips interlacing with the plurality of first electrode strips and extending along a column direction; wherein the plurality of first electrode strips and the plurality of
(Continued)

second electrode strips have widths varying along the column direction to thereby realize complementary shapes.

16 Claims, 8 Drawing Sheets

(51) Int. Cl.
    *G02F 1/1335*      (2006.01)
    *G02F 1/1343*      (2006.01)
    *G06F 3/041*      (2006.01)

(56) References Cited

U.S. PATENT DOCUMENTS

2014/0168536 A1   6/2014   Guo et al.
2014/0293158 A1  10/2014  Kurasawa et al.
2015/0049047 A1*  2/2015  Liao ........................ G06F 3/044
                                                         345/174

OTHER PUBLICATIONS

International Search Report and Written Opinion dated Aug. 25, 2016 in PCT/CN2016/082896.
3rd Office Action dated Sep. 7, 2018 in 201510850276.3.

* cited by examiner

… (1)

ELECTRODE LAYER, TOUCH PANEL, AND DISPLAY APPARATUS

CROSS-REFERENCES TO RELATED APPLICATIONS

The present application claims priority to Chinese Patent Application No. 201510850276.3 filed on Nov. 27, 2015, the disclosure of which is hereby incorporated by reference in its entirety.

TECHNICAL FIELD

The present disclosure relates to the field of display technologies, and more specifically to an electrode layer in display technologies, a touch panel, and a display apparatus.

BACKGROUND

Thin film patterning process has been widely used in the electronics field, and its applications have been extended to the manufacturing process of some sophisticated equipment, such as a display apparatus.

For example, a conventional touch-control panel, also referred to as a touch panel, generally comprises multiple non-contacting drive electrodes and sense electrodes formed on a base substrate, wherein the drive and sense electrodes include a plurality of electrode strips formed by thin film patterning.

SUMMARY

Embodiments disclosed herein provide an electrode layer, a touch-control panel, and a display apparatus. The touch-control panel or display apparatus includes one or more electrode layers.

In an aspect, an electrode layer is provided including: a plurality of first electrode strips; and a plurality of second electrode strips interlacing with the plurality of first electrode strips and extending along a column direction; wherein the plurality of first electrode strips and the plurality of second electrode strips have complementary shapes such that amount of light reflection from a first row region is similar to light reflection from a second, neighboring, row region to thereby reduce or eliminate light and dark stripes resulting from light reflection by the plurality of first and second electrode strips.

In some embodiments, a first electrode strip among the plurality of first electrode strips has a width that increases along the column direction in a first row region; and a neighboring second electrode strip among the plurality of second electrode strips has a width that decreases along the column direction in the first row region.

In some embodiments, the first electrode strip has a first side surface in the first row region deflected outward from a first side and relative to the column direction, a second side surface in the first row region deflected outward from a second side opposing the first side relative to the column direction; and the neighboring second electrode strip has a third side surface in the first row region deflected inward to complement the second side surface.

In some embodiments, the complementary shapes are configured to allow light reflection from neighboring column regions to compensate neighboring row regions such that amount of light reflection from the first row region is similar to light reflection from a second, neighboring, row region to thereby reduce or eliminate light and dark stripes resulting from light reflection by the plurality of first and second electrode strips.

In some embodiments, each of the plurality of first and second electrode strips has: opposing top and bottom surfaces; and two sides each including a plurality of interlacing protrusions and recesses forming the complementary shapes.

In some embodiments, for any one of the plurality of first or second electrode strips, at the two sides the protrusions are disposed opposing each other, and the recesses are disposed opposing each other; for any two neighboring sides of the plurality of first or second electrode strips, the protrusions are disposed opposing the recesses.

In some embodiments, among the plurality of first or second electrode strips, the two sides have the protrusions configured to be mirror symmetric, and the recesses also configured to be mirror symmetric.

In some embodiments, at any one side the protrusions and recesses form wavy or serrated surfaces.

In some embodiments, for the plurality of first or second electrode strips, the protruding portions and the recessed portions are periodically arranged.

In some embodiments, the two sides of the plurality of first or second electrode strips have sloped side surfaces.

In some embodiments, a slope angle between the sloped surfaces and the bottom surface is in a range of about 0°-30°.

In some embodiments, the electrode layer is a transparent layer comprising at least one of indium tine oxide (ITO) or indium zinc oxide (IZO).

In some embodiments, the electrode layer comprises a touch-control sense electrode and a touch-control drive electrode; wherein the touch-control sense electrode and the touch-control drive electrode respectively comprises the plurality of electrically-coupled first electrode strips and the plurality of electrically-coupled second electrode strips.

In another aspect, a touch-control panel is provided, comprising the electrode layer described above.

In some embodiments, the touch-control panel further comprises a thin-film transistor (TFT) substrate.

In some embodiments, the electrode layer is configured to have a single-layer on-cell (SLOC) structure.

In another aspect, a display apparatus is provided comprising the touch-control panel described above.

In some embodiments, the display apparatus comprises at least one of a TV, a computer, a smart phone, or a tablet computer.

In another aspect, a method of forming an electrode layer is provided, the method comprising: patterning a transparent conductor layer along a plurality of columns to form a plurality of first electrode strips; and a plurality of second electrode strips interlacing with the plurality of first electrode strips and extending along a column direction; wherein the plurality of first electrode strips and the plurality of second electrode strips have widths varying along the column direction to thereby realize complementary shapes such that light reflection from a first row region is similar to light reflection from a second, neighboring, row region to thereby reduce or eliminate light and dark stripes resulting from light reflection by the plurality of first and second electrode strips.

In some embodiments, the patterning comprises etching to form two sides each of the plurality of first or second electrode strips as sloped side surfaces; and a slope angle between the sloped side surfaces and a bottom surface resulting from the etching is in a range of about 0°-30°.

As such, in some of the embodiments, each row includes inward deflection and outward deflection sides, the amount of reflection by the outward deflection side of the first electrode strip is similar to the amount of reflection by the outward deflection side of the second electrode strip; that is, the amounts of reflection light reflection between different rows are similar, thereby reducing or avoiding the formation of distinct bright and dark stripes.

Other embodiments and implementations may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, without the premise of inventive efforts, other drawings of other embodiments can become apparent based on these drawings.

DETAILED DESCRIPTION

In the following, with reference to the drawings of various embodiments disclosed herein, the technical solutions of the embodiments of the disclosure will be described in a clear and fully understandable way. It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

The "up" and "down" referred to in various embodiments of the disclosure are adopted based on the order of the film formation. For example, "up" may refer to the thin film portion formed at a relatively later stage, and "down" may refer to the thin film portion formed at a relatively early stage. It should be understood that these terms concerning directions are relative, and are used to describe and clarify the relative relationship, which can be varied in accordance with a corresponding change in orientation. In another example, the "columns" and "rows" referred to in various embodiments of the disclosure can also be relative, and the definitions of which can also be varied in accordance with a corresponding change in orientation. For example, in some implementations, the "column" and "row" can be interchangeable.

Some embodiments disclosed herein provide an electrode layer, a touch panel, and a display apparatus in the field of display technology. Various implementations are provided that can at least partially solve the problems fringe patterns in existing electrode layers. An electrode layer comprising: a plurality of first electrode strips and a plurality of second electrode strips extending in a same direction and having a specified thickness, the plurality of first electrode strips and the plurality of second electrode strips arranged in an interlacing pattern, the plurality of first electrode strips and the plurality of second electrode strips respectively include: opposing top and bottom surfaces, and two sides between the top and bottom surfaces; the sides include a plurality of interlacing protrusions and recesses; for any one of the plurality of first electrode strips or the plurality of second electrode strips, the protrusions of the two sides are disposed opposing each other, and the recesses are disposed opposing each other; for any two adjacent sides of the plurality of first electrode strips or the plurality of second electrode strips, the protrusions oppose the recesses.

Various embodiments disclosed herein can be used for many different types of touch-control display apparatuses, such as tablet computers, smart phones, touch-screen laptop and desktop computers, touch-screen TVs, etc.

Figure 1A:
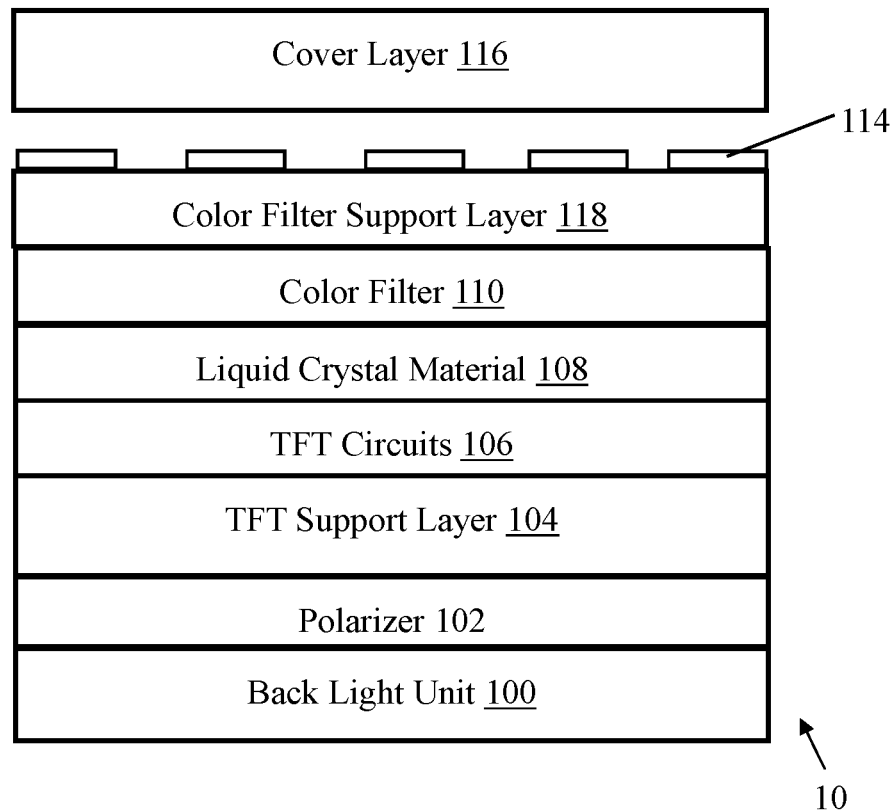
FIG. 1A is a cross-sectional view of a display apparatus according to some embodiments.

A cross-sectional view of an example of a touch-control panel of a display apparatus 10 is illustrated in FIG. 1A. For a liquid crystal display (LCD) apparatus, from bottom to top the display apparatus may include a back light unit 100, and a polarizer 102. For other types of displays, such as a light-emitting diode (LED) display or an organic LED (OLED) display, the back light unit 100 and the polarizer 102 may not be needed. The display apparatus 10 can further comprise, a thin-film transistor (TFT) substrate, which may include a support layer g104 made of glass, plastic, etc., and, a TFT circuit 106. For an LCD apparatus, a liquid crystal (LC) material layer 108, and a color filter (CF) substrate including a color filter 110 and a CF support layer 118 can be included. The CF support layer 118 can be made of glass, and is sometimes referred to as the CF glass. In some implementations, flexible materials such plastic can be employed instead of glass.

The display apparatus can further comprise a sensor layer 114, and a cover layer 116. The cover layer 116 can be made of glass, or can be made of other types of materials such as flexible materials. The sensor layer 114 can include a plurality of electrode strips, for example made of transparent indium-tin-oxide (ITO) materials. Because the refractive indices of the ITO film and the CF glass layer generally are different, the patterns of the electrode (sensor) layer 114 can become apparent to users. This effect can become stronger for sloped side surfaces in the etched ITO patterns, as described in more detail below.

Technologies adopting the sensor layer 114 on the color filter support layer (e.g., CF glass) 118 are often referred to as "on-cell" technologies, as compared with "in-cell" technologies where the sensor layer 114 may be integrated with an LCD cell layer including the TFT circuits 106, the LC material layer 108, and the color filter layer 110.

The sensor layer 114 may include transmit-and-receive grids. The grids can be electrically isolated with jumpers. Alternatively, the grids can be electrically isolated within one layer by spatial patterns. This is often referred to the single-layer-on-cell (SLOC) technology. The SLOC technology and various other technologies can employ the electrode layer according to embodiments disclosed herein.

Figure 1B:
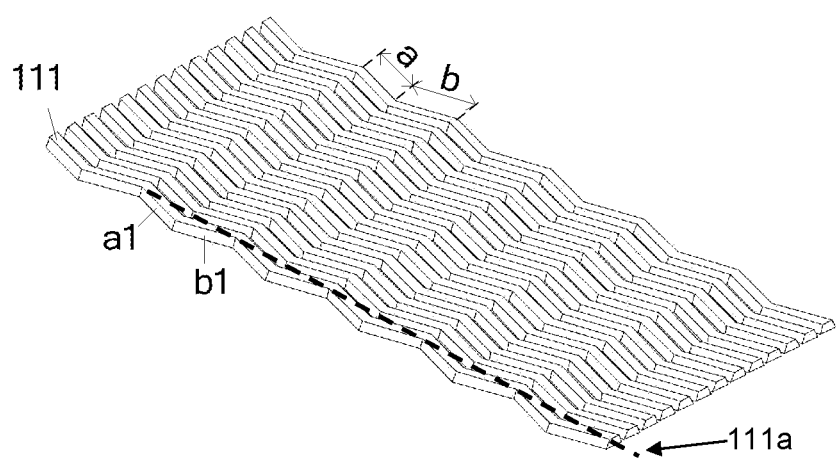
FIG. 1B is a perspective view of a conventional electrode layer.

The sensor layer can include various configurations. Referring to FIG. 1B for an example of a conventional electrode strip 111 with a zigzag pattern. For each electrode strip 111, an axis 111a can be defined along the extension direction of the electrode strip 111. In a relative direction from left to right along the axis 111, a first side surface a1 extends outward from the axis 111a, and a second side surface a2 extends inward toward the axis 111a. On the other side of the electrode strip 111, its side surfaces have substantially the same shapes and deflection directions. The plurality of electrode strips also have the same patterns, and each of the plurality of electrode strips 111 has a substantially same width that does not vary along the axis 111a, despite of the deflections.

For two neighboring electrode strips, at their respective neighboring sides the sloped surfaces also have the same deflection directions.

As such, when a user views the display at a certain angle, there may be a pattern of light and dark stripes formed by the electrode strips, degrading the display quality.

Figure 2:
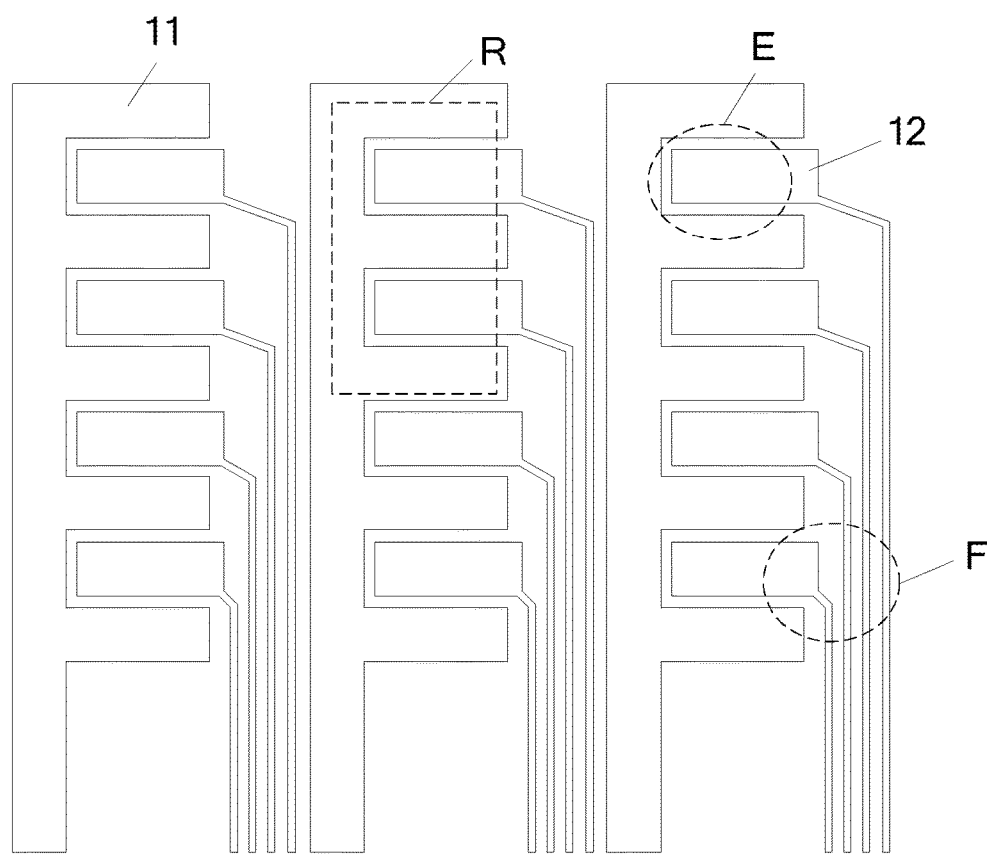
FIG. 2 is a schematic view of a conventional touch-control panel electrode layer.

As illustrated in FIG. 2, which is a schematic diagram of a conventional electrode layer of a touch panel, including a touch-control drive electrode 11 and a touch-control sense electrode 12. FIG. 2 shows that for the touch panel, because there are more kerfs in the area F, and fewer kerfs at the region E, there is a difference in the touch control between the touch areas E and F.

Figure 3:
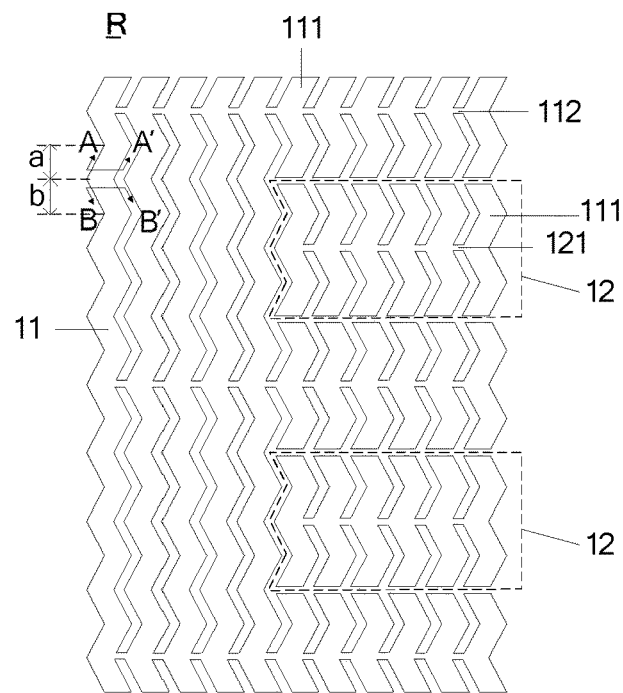
FIG. 3 is a partial enlarged schematic view of the electrode layer in FIG. 2.

To reduce or avoid the abovementioned difference in the touch control, in a conventional technology as illustrated in FIG. 3, in the touch panel, both the touch-control drive electrodes 11 and the touch-control sense electrodes 12 are formed with a plurality of kerfs, such that the touch-control drive electrodes 11 and the touch-control sense electrodes 12 comprise a plurality of electrode strips 111.

Straight strips of electrodes may be prone to diffraction. As such, as illustrated in FIG. 3, zigzag-shaped electrode strips 111 are employed. A plurality of first connecting portions 112 can be employed to couple some of the plurality of electrode strips 111 to form the touch-control drive electrode 11. A plurality of second connection portions 121 can be employed to couple some of the plurality of electrode strips 111 to form the touch-control sense electrode 12.

As a result of the etching process, the sides of the electrode strips generally can have sloped surfaces with certain slope angles. Zigzag-shaped electrode strips, when reflecting light, can therefore form bright and dark stripes, as described in more detail below:

As shown in FIG. 3, the electrode strips 111 can be considered as having rows a regions and rows b regions with different deflection directions. It is noted that these "rows" a and b are not necessarily discrete or separate rows, but can be different regions of an integrally-formed portion. In addition, the definitions of "rows" and "columns" are also relative and depend on the orientation of the panel. In some embodiments, the "rows" defined herein can be "columns," or vice versa.

Figure 4A:
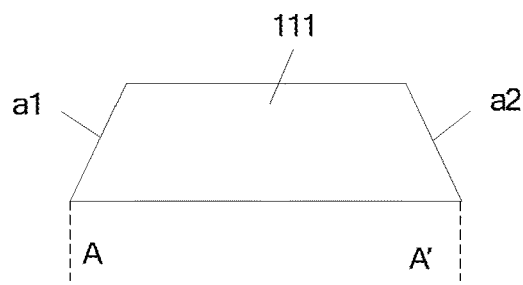
FIG. 4A is the A-A' cross-sectional view of an electrode strip in FIG. 3.
Figure 4B:
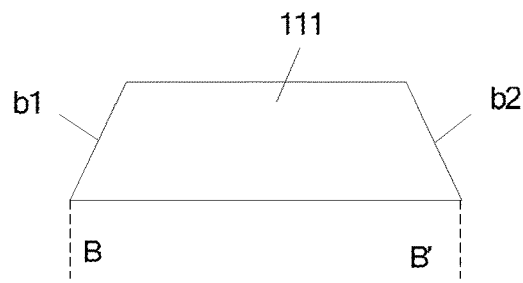
FIG. 4B is the B-B' cross-sectional view of the electrode strip in FIG. 3.

All electrode strips 111 can have sloped side surfaces. FIG. 4A is the A-A' cross-sectional view of an electrode strip of FIG. 3. FIG. 4B is the B-B' cross-sectional view of the electrode strip of FIG. 3. Despite of the similar profiles at A-A' and B-B', because the electrode strip bending or deflection directions are different at these locations, the light reflection can be different when viewed from different angles. This is more clearly shown in FIG. 4C, which is a perspective view of a plurality of electrode strips of FIG. 3, and also in FIG. 4D, which is a cross-sectional view of an electrode strip illustrating an effect of direction-dependent light reflection.

Figure 4C:
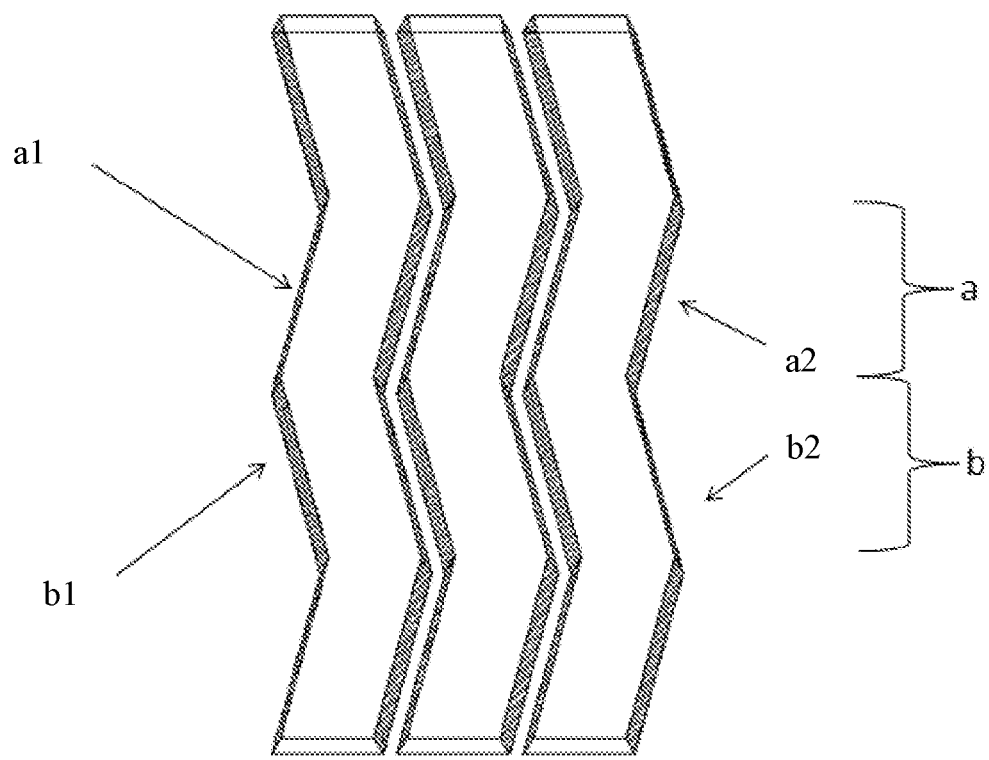
FIG. 4C is a perspective view of a plurality of electrode strips in FIG. 3.
Figure 4D:
FIG. 4D is a cross-sectional view of a conventional electrode strip illustrating an effect of direction-dependence of light reflections.

As shown in FIG. 4C, when viewed in the a1, a2 directions, row a would appear brighter than row b from the reflected light. Conversely, when viewed in the b1, b2 directions, row b would appear brighter than row a as a result of the reflected light.

More specifically, as illustrated in FIG. 4A, the electrode strips 111 in row a include sloped surfaces a1 and sloped surfaces a2. As shown in FIG. 4B, electrode strips 111 in row b include sloped surfaces b1 and sloped surfaces b2. The profiles as shown in FIG. 4A and FIG. 4B are substantially the same. However, because row a is deflected outwards from the axis 111' (as illustrated in FIG. 1B) in a relative direction from top down, while row b is deflected inwards toward the axis 111', the effects of row a and row b on the viewers can be very different.

As shown in FIG. 1B and FIG. 4C, at an angle, the user can receive portions of reflected light from the sloped surfaces a1 of the electrode strips 111 in row a, and from the sloped surfaces b1 of the electrode strips 111 in row b. However, the user receives less light reflected from the sloped surface b1 compared the light reflected from the sloped surface a1 because their opposite bending directions relative to the axis 111a. As such, row a electrode strips 111 appear to be brighter than the row b electrode strips 111 to the viewer at certain angles. Light and dark stripes can therefore form in the images, resulting in poor user experience, as explained in more detail below with reference to FIGS. 4A-4D.

Figure 5:
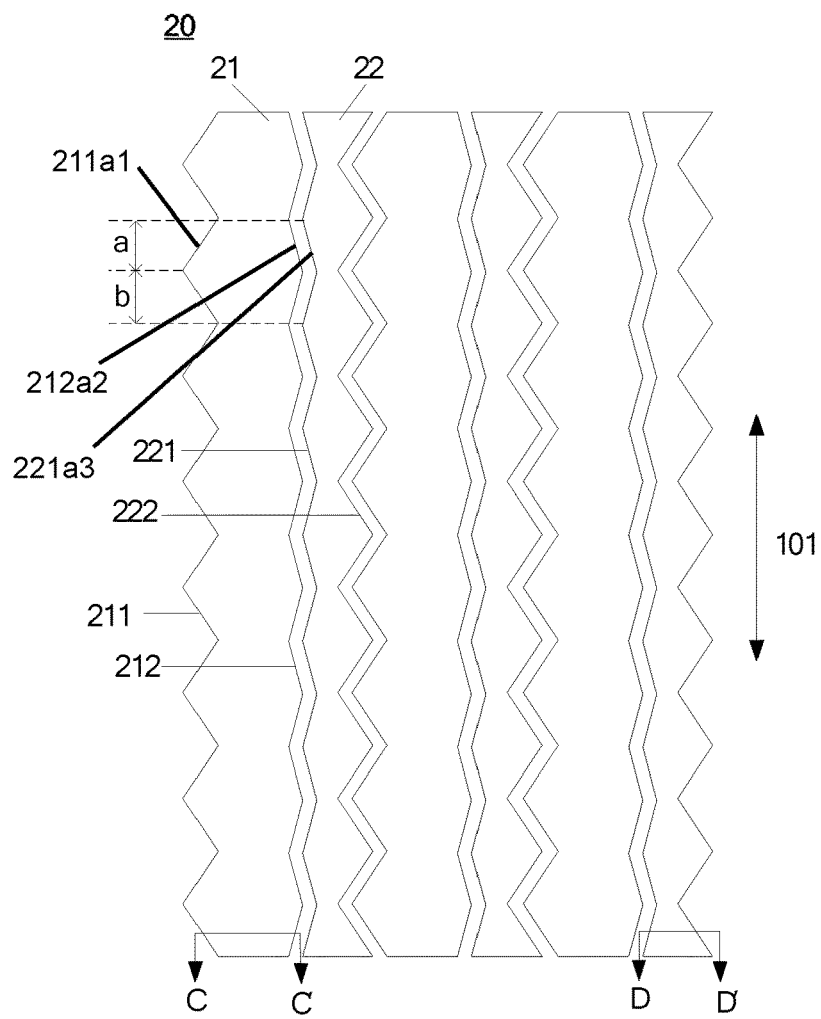
FIG. 5 is a top plan view of an electrode layer according to some embodiments.

To overcome the above problems, as shown in FIG. 5, some embodiments of the present disclosure provide an electrode layer, including: a plurality of first electrode strips; and a plurality of second electrode strips interlacing with the plurality of first electrode strips and extending along a column direction (e.g., direction 101 in FIG. 5). Each electrode strip can have widths varying along the column direction to thereby realize complementary shapes.

The plurality of first electrode strips and the plurality of second electrode strips have complementary shapes such that light reflection from a first row region is similar to light reflection from a second, neighboring, row region to thereby reduce or eliminate light and dark stripes resulting from light reflection by the plurality of first and second electrode strips. Some example complementary shapes are illustrated in the drawings, but other complementary shapes can also be employed.

In some embodiments, the complementary shapes are configured to allow light reflection from neighboring column regions to compensate neighboring row regions.

In some embodiments, each of the plurality of first and second electrode strips has: opposing top and bottom surfaces, and two sides each including a plurality of interlacing protrusions and recesses forming the complementary shapes.

For example, the plurality of first and second electrode strips can extend substantially in a same direction and have a specified thickness. The plurality of first and the plurality of second electrode strips can be disposed in an interlacing pattern. The plurality of first and second electrode strips respectively include: opposing top and bottom surfaces, and two sides between the top and bottom surfaces; the sides include a plurality of interlacing protrusions and recesses; for any one of the plurality of first electrode strips or the plurality of second electrode strips, at the two sides the projections are opposing each other, and the recesses are disposed opposing each other; for any two adjacent sides of the first or second electrode strips, the protrusions oppose the recesses.

As such, in some of the embodiments, row a and row b both include inward and outward deflection sides, and thus the amount of light reflection is similar for the outward deflection sides in row a and the outward deflection sides in row b, thereby avoiding or reducing the formation of apparent light and dark strips at row a and row b.

More specifically, an electrode layer 20 illustrated in FIG. 5 includes a plurality of first electrode strips 21 with specified thicknesses and extending along substantially the same direction (the direction 101 shown in FIG. 5), and a plurality of second electrode strips 22 with specified thicknesses and extending along substantially the same direction (the direction 101 shown in FIG. 5; also referred to as a "column" direction), wherein the plurality of first electrode strips 21 and the plurality of second electrode strips 22 are interlaced. For example, one first electrode strip 21 has a neighboring second electrode strip 22, which has another neighboring first electrode strip 21 on the other side, and so on.

Figure 6A:
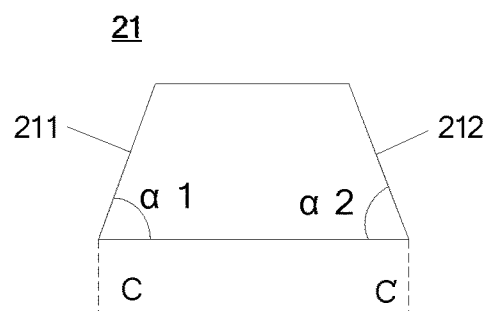
FIG. 6A of is the C-C' cross-sectional view of FIG. 5.
Figure 6B:
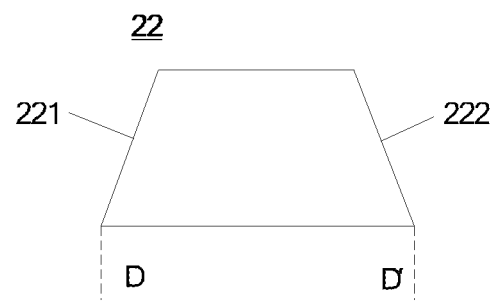
FIG. 6B of is the DD' cross-sectional view of FIG. 5.

FIG. 6A is a partial cross-sectional schematic view of the structure of the first electrode strip 21 shown in FIG. 5. FIG. 6B is a partial cross-sectional schematic view of the second electrode strip 22 shown in FIG. 5. Referring to FIG. 5 and FIG. 6A, the first electrode strip 21 comprises: opposing top and bottom surfaces, and a first side 211 and a second side 212 between the top and bottom surfaces. As illustrated in FIG. 5 and FIG. 6B, the second electrode strip 22 includes: opposing top and bottom surfaces, and a third side 221 and a fourth side 222 between the top and bottom surfaces.

As shown in FIG. 5, the first side 211 and the second side 212 of the first electrode strip 21 each include a plurality of interlacing protrusions and recesses; the third side 221 and the fourth side 222 of the second electrode 22 each include a plurality of interlacing protrusions and recesses.

More specifically, the first side 211 has a first side surface 211a1 in the first row a region deflected outward from the first side 211 and relative to the column direction 101 (from top down in FIG. 5), and a second side surface 212a2 in the first row a region deflected outward from the second side 212 opposing the first side 211 relative to the column direction 101. The second electrode strip 22 has a third side surface 221a3 in the first row a region deflected inward to complement the second side surface 212a2. As such, within the same row a, the first electrode strip 21 has both side surfaces 211a1, 212a2 deflected outward, with a width increasing along the column direction 101 from top down in FIG. 5, in contrast to the electrode strips illustrated in FIGS. 3 and 4C.

Therefore, the first electrode strip 21 among the plurality of first electrode strips has a width that increases along the column direction 101 in a first row a region; and the neighboring second electrode strip 22 among the plurality of second electrode strips has a width that decreases along the column direction 101 in the first row a region.

Figure 7:
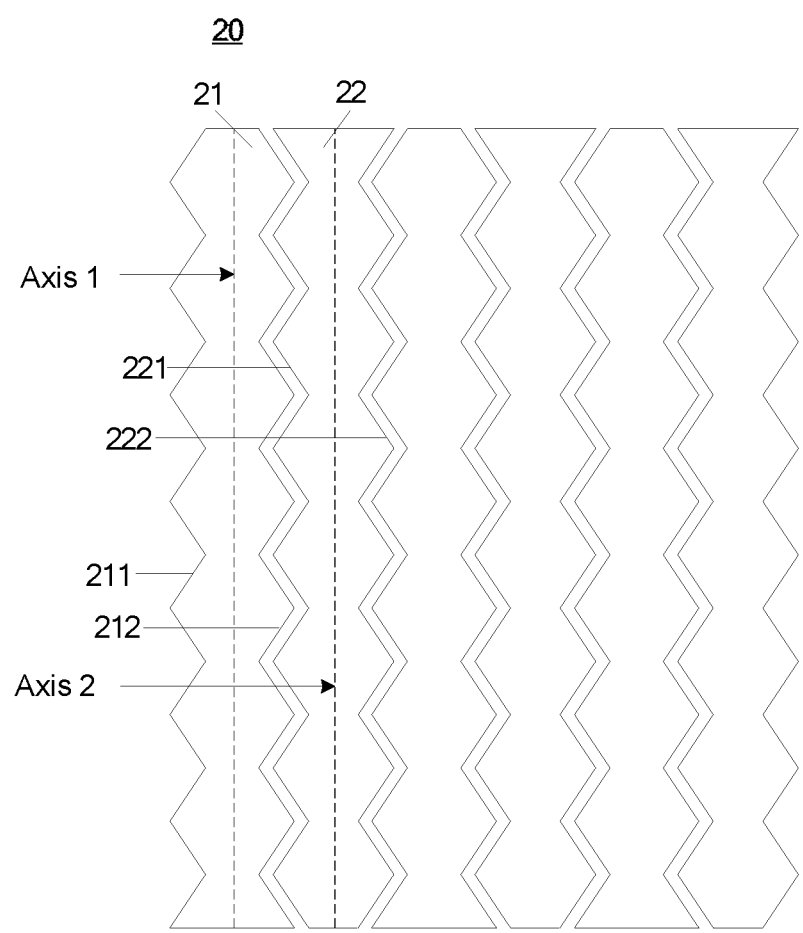
FIG. 7 is a top plan view of another electrode layer according to some embodiments.

As shown in FIG. 5, the two side surfaces 211a1, 212a2 are not necessarily symmetric. In some other embodiments, as illustrated in FIG. 7, the two side surfaces can be mirror symmetric relative to a central axis of the first electrode strip 21.

For any one of the plurality of first electrode strips 21 or the plurality of second electrode strips 22, the two sides have their protrusions aligned with each other, and their recesses aligned with each other. For any neighboring first electrode strips 21 and second electrode strips 22, their two neighboring sides have protrusions facing the recesses.

Specifically, as shown in FIG. 5, of the first electrode strip 21, the first side 211 and the second side 212 have their protrusions aligned. The recesses are also aligned with each other. Of the second electrode strip 22, the third side 221 and the fourth side 222 have their protrusions aligned with each other, and their recesses are also arranged to be aligned with each other. Between the neighboring first electrode strips 21 and the second electrode strips 22, the second side 212 of the first electrode strip 21 and the third side 221 of the second electrode strip 22 have their protrusions aligned with recesses.

For the convenience of explanation, the electrode layer can be divided into row a and row b, as shown in FIG. 5, although row a and row b are not necessarily separate or discrete rows. The plurality of first electrode strips 21 have both their first sides 211 and second sides 212 outwardly deflected in row a, forming protrusions; the plurality of second electrode strips 22 have their third sides 221 and fourth sides 222 are deflected inwardly in row a, forming recesses.

The plurality of first electrode strips 21 have their the first sides 211 and second sides 212 inwardly deflected at row b, forming recesses. The plurality of second electrode strips 22 have their third side edges and fourth side edges deflected outward at row b, forming protrusions. That is, row a and row b both include inward and outward deflection sides, therefore the amount of light reflection is similar for the outward deflection sides in row a and the outward deflection sides in row b, thereby avoiding or reducing the formation of light and dark stripes at row a and row b.

It should be noted that the two sides of the plurality of first and second electrode strips may have various shapes not limited to those shown in the drawings. The shapes of the electrode strips illustrated in FIGS. 5-9 only serve as examples, where example protrusions and recesses at the sides of the plurality of first and second electrode strips. In some other examples, the sides can include smooth wavy curves, arc-shaped protrusions and recesses, etc.

In some embodiments, as shown in FIG. 7, among the plurality of first electrode strips or the plurality of second electrode strips, the two sides have the protrusions configured to be mirror symmetric, and the recesses are also configured to be mirror symmetric. As illustrated in FIG. 7, the first side 211 and the second side 212 of the first electrode strip 21 have mirror symmetry with respect to axis 1, the third side 221 and the fourth side 222 of the second electrode strip 22 have mirror symmetry with respect to axis 2.

As such, the outward deflection sides and the inward deflection sides located in row a or row b are about the same. As a result, the first electrode strip at row b and the second electrode strip at row a have about the same amount of reflected light, that is, between the different rows the amount of light reflection is about the same, thereby avoiding or reducing the formation of light and dark stripes.

According to some embodiments, of any side the protrusions and recesses can form wavy or serrated surfaces. Specifically, referring to FIG. 5 and FIG. 7, the protrusions and recesses of the sides form a jagged side. If the protrusions and recesses form a wavy side, the protrusions and recesses can have an arc shape. It is noted that the sides are not limited to have wavy or zigzag surfaces, but can be any curved surfaces, as long as the recesses and the protrusions of the same electrode strip correspond to each other.

According to some embodiments, among the plurality of first electrode strips or the plurality of second electrode strips, the protrusions and the recesses are arranged in a periodical pattern. Some embodiments disclosed herein and some of the drawings use a protrusion as of one period as an example. However, within one period there may be a plurality of protrusions with different shapes. For example, there can be two types of protrusions and recesses such as wave shapes and zigzag shapes within a same period.

In some embodiments, among the plurality of first electrode strips and the plurality of second electrode strips, the two sides of each electrode are sloped surfaces. As illustrated in FIG. 6A, using the plurality of first electrode strips as an example, the first side 211 and the bottom surface of the first electrode strip form an angle of $\alpha 1$. For example, the angle $\alpha 1$ can be an acute angle. Specifically, the slope angle between the side and the bottom surface is about 10°-80°. For example, the slope angle between the side and the bottom surface can be about 10°-30°, such as 15°, 20°, or 25°.

Taking the angle $\alpha 2$ between the second side 221 and the bottom surface for an example, the angle $\alpha 2$ can be an acute angle. Specifically, the slope angle between the side surface and the bottom surface can be about 10°-80°. For example, the slope angle between the side surface and the bottom surface is in a range of about 0°-30°. Wherein, $\alpha 1$ and $\alpha 2$ can be the same, or can be different. For larger slope angles, e.g., the side surfaces close to being vertical, the reflection-induced light and dark stripe pattern issue may be less serious. However, it can be difficult for the processing particularly etching to achieve such large angles. Various embodiments disclosed herein therefore afford the slope angles to be relative small, such as in a range of about 0°-30°, yet still can reduce or eliminate the issues discussed above with respect to the conventional zigzag-shaped electrode strips.

Figure 8A:
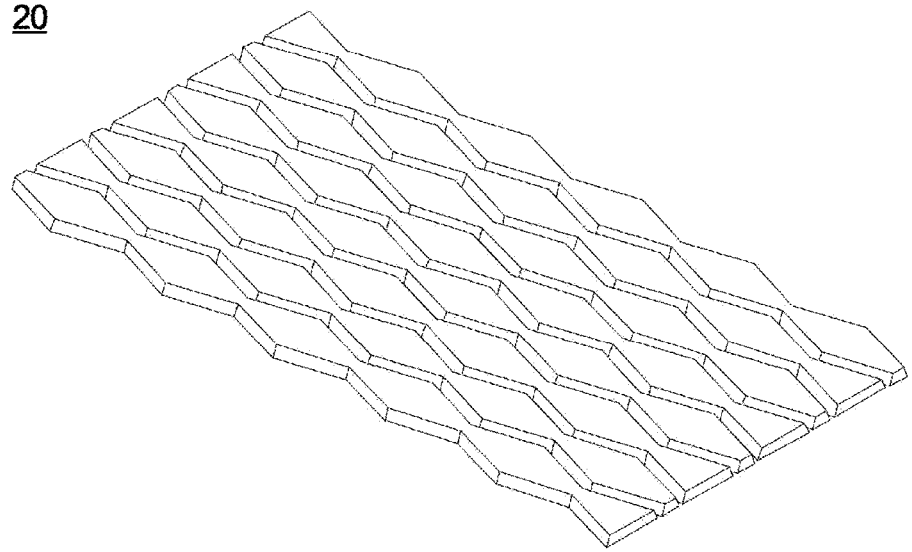
FIG. 8A is a perspective view of the electrode layer according to some embodiments.

FIG. 8A is a perspective schematic view of an electrode strip according to some embodiments. Affected by the etching process, the etched surfaces generally are formed with some inclination angles. With respect to the illustrations in FIG. 2-FIG. 4, the smaller the angle between the sides and the bottom surfaces, the sides reflect less light, thereby are less prone to forming light and dark stripes. However, because of the limit of the processing, if the angle between the side surface and the bottom surface is too small, it will be difficult to fabricate. According to some embodiments, the electrode strips have angles between the side surfaces and the bottom surfaces of 10°-30°.

Figure 8B:
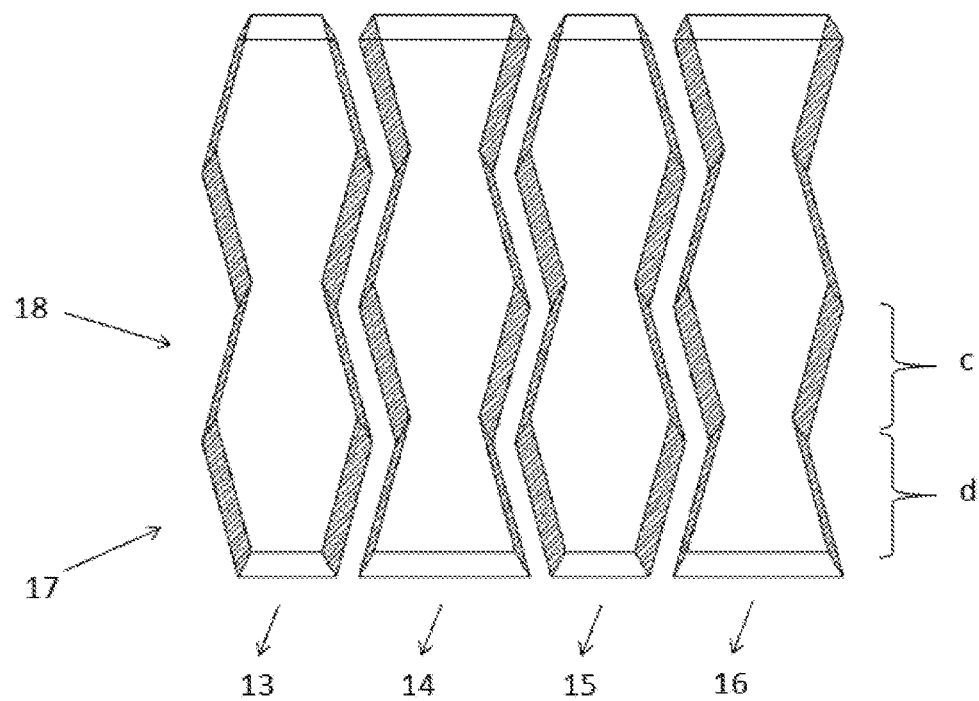
FIG. 8B is a perspective view of a magnified portion of the electrode layer in FIG. 8A.

FIG. 8B is a perspective view of a magnified portion of the electrode layer in FIG. 8A. As shown, when viewed from the direction 17, the "row" region d may have the sloped side surfaces of columns 13, 15 become more visible through the reflected light, and the "row" c region may have the sloped side surfaces of columns 14, 16 become more visible through the reflected light.

Similarly, when viewed from the direction 18, the "row" region c may have the sloped side surfaces of columns 13, 15 become more visible through the reflected light, and the "row" d region may have the sloped side surfaces of columns 14, 16 become more visible through the reflected light.

As such, the complementary shapes in neighboring rows 13, 14 or 15, 16 allow light reflection from neighboring column regions to compensate neighboring row regions, and the visibility of the electrode strips through the reflected light can be reduced or eliminated.

The materials of the electrode layer can be selected based on the applications of the electrode layer. For example, when the electrode layer is used in the display technology and is located in the display area, in general, the electrode layer can be a transparent conductive layer. For example, it can be indium tin oxide (ITO), indium zinc oxide (IZO), or other transparent metal oxide films.

In some embodiments, the electrode layer can be used in the touch-control circuits. For example, the electrode layer can be used as touch-control sensing electrodes, and also can be used as the touch-control drive electrode.

The electrode layer used as touch-control sense electrodes and drive electrodes are for illustration only. The touch-control drive electrodes and sense electrodes can include an electrode layer according to some embodiments disclosed herein, but the shapes of the touch-control drive electrodes and the touch-control drive electrodes are not limited by the examples disclosed herein.

If a touch-control drive electrode or a touch-control sense electrode includes the electrode layer described above, in some embodiments, the plurality of first electrode strips and the plurality of second electrode strips of that electrode layer can be electrically coupled to form a conductor.

Figure 9:
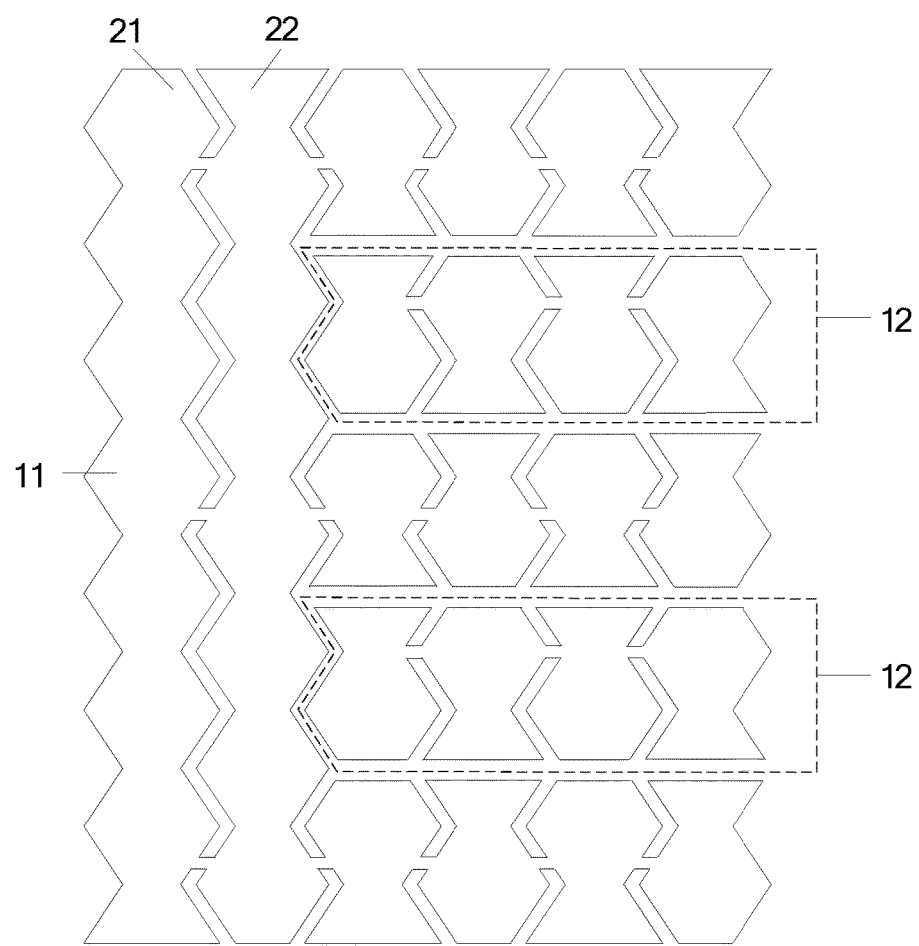
FIG. 9 is a schematic view of a touch-control drive electrode and a touch-control sense electrode according to some embodiments.

In some embodiments, the first electrode layer includes touch-control sense electrodes and touch-control drive electrodes. The touch-control sense electrodes and touch-control drive electrodes respectively include a plurality of first electrically-coupled electrode strips and a plurality of second electrically-coupled electrode strips. As shown in FIG. 9, the first electrode layer 12 comprises a plurality of electrically-coupled first electrode strips 21, and a plurality of second electrode strips 22. The touch-control sense electrode 12 includes a plurality of first electrode strips 21 electrically coupled to the second electrode strips 22. The touch-control drive electrode 11 includes the plurality of electrically-coupled first electrode strips 21 and the plurality of electrically-coupled second electrode strips 22.

That is, when fabricating the touch-control drive electrode 11 and the touch-control sense electrode 12, the local pattern is fabricated based on the patterns of the plurality of first electrode strips and the plurality of second electrode strips, and the overall pattern is formed based on the needs. For example, as shown in FIG. 9, the overall pattern of the touch-control drive electrodes 11 comprises a comb-like structure, while each of the comb teeth and the comb handles are formed in accordance with the patterns of the plurality of first electrode strips and the plurality of second electrode strips.

Embodiments of the disclosure provide a touch panel, including the electrode layer as illustrated with respect to some embodiments described above. The touch panel can be a built-in, a plug-in, or other forms of touch panel.

The touch panel according to some embodiments comprises a touch control drive electrode and a touch-control sense electrode. The touch-control drive electrode and the touch-control sense electrode each include a plurality of first and second electrode strips. The plurality of first electrode strips and the plurality of second electrode strips respectively include: opposing top and bottom surfaces, and two sides between the top and bottom surfaces; the sides include a plurality of interlacing protrusions and recesses; for any one of the plurality of first electrode strips or the plurality of second electrode strips, at the two sides the protrusions are disposed opposing each other, and the recesses are disposed opposing each other. For any two adjacent sides of the first or second electrode strips, the protrusions oppose the recesses.

As such, in some embodiments of the disclosure, each row includes inward deflection and outward deflection sides, thereby having varying widths along the column direction. For example, the width of an electrode strip increases along the column direction following the outward deflection, and decreases along the column direction following the inward deflection. The amount of light reflection by the outward deflection side of the first electrode strip is similar to the amount of light reflection by the outward deflection side of the second electrode strip. Therefore, the amounts of light reflection between different rows are similar, thereby reducing or avoiding the formation of distinct bright and dark stripes.

Various embodiments also provide a display apparatus, comprising a touch-control panel according to some embodiments disclosed herein. The display apparatus can be or part of an LCD, e-paper, an LED display, an OLED display, or other types of display apparatuses. Many display products or components can employ the electrode layer, touch panel, or display apparatus disclosed herein. Such products may include, for example, TVs, digital cameras, mobile phones, tablet computers, etc. The display apparatus can also be, or be part of, a wearable device or a medical device.

Various embodiments disclosed in can be part of or can include various technologies, such as the SLOC capacitive touch technologies, other on-cell or in-cell technologies. Pattern visibility issues can be significantly improved. For example, in existing technologies, the overall electrode patterns can become undesirably visible to users as a result of light reflection/transmission differences in the etched regions and the unetched regions. By designing the electrode patterns according to various embodiments disclosed herein, the undesirable patterns can be reduced or eliminated, realizing improved image qualities.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:
1. An electrode layer, comprising:
a plurality of first electrode strips; and
a plurality of second electrode strips interlacing with the plurality of first electrode strips and extending along a column direction;
wherein:
the plurality of first electrode strips and the plurality of second electrode strips have widths varying along the column direction to thereby realize complementary shapes;
a first electrode strip among the plurality of first electrode strips has a width that increases along the column direction in a first row region; and
a neighboring second electrode strip among the plurality of second electrode strips has a width that decreases along the column direction in the first row region.

2. The electrode layer of claim 1, wherein:
the first electrode strip has a first side surface in the first row region deflected outward from a first side and relative to the column direction, a second side surface in the first row region deflected outward from a second side opposing the first side relative to the column direction; and
the neighboring second electrode strip has a third side surface in the first row region deflected inward to complement the second side surface.

3. The electrode layer of claim 2, wherein the complementary shapes are configured to allow light reflection from neighboring column regions to compensate neighboring row regions such that amount of light reflection from the first row region is similar to light reflection from a second, neighboring, row region to thereby reduce or eliminate light and dark stripes resulting from light reflection by the plurality of first and second electrode strips.

4. The electrode layer of claim 3, wherein each of the plurality of first and second electrode strips has:
opposing top and bottom surfaces; and
two sides each including a plurality of interlacing protrusions and recesses forming the complementary shapes.

5. The electrode layer of claim 4, wherein:
for any one of the plurality of first or second electrode strips, at the two sides the protrusions are disposed opposing each other, and the recesses are disposed opposing each other;
for any two neighboring sides of the plurality of first or second electrode strips, the protrusions are disposed opposing the recesses.

6. The electrode layer of claim 5, wherein among the plurality of first or second electrode strips, the two sides have the protrusions configured to be mirror symmetric, and the recesses also configured to be mirror symmetric.

7. The electrode layer of claim 5, wherein at any one side the protrusions and recesses form wavy or serrated surfaces.

8. The electrode layer of claim 7, wherein for the plurality of first or second electrode strips, the protruding portions and the recessed portions are periodically arranged.

9. The electrode layer of claim 4, wherein the two sides of the plurality of first or second electrode strips have sloped side surfaces.

10. The electrode layer of claim 9, wherein a slope angle between the sloped surfaces and the bottom surface is in a range of about 0°-30°.

11. The electrode layer of claim 1, wherein the electrode layer is a transparent layer comprising at least one of indium tine oxide (ITO) or indium zinc oxide (IZO).

12. The electrode layer of claim 1, wherein the electrode layer comprises a touch-control sense electrode and a touch-control drive electrode; wherein the touch-control sense electrode and the touch-control drive electrode respectively comprises the plurality of electrically-coupled first electrode strips and the plurality of electrically-coupled second electrode strips.

13. A touch-control panel, comprising an electrode layer including:
a thin-film transistor (TFT) substrate;
a plurality of first electrode strips; and
a plurality of second electrode strips interlacing with the plurality of first electrode strips and extending along a column direction;

wherein:
the plurality of first electrode strips and the plurality of second electrode strips have widths varying along the column direction to thereby realize complementary shapes; and
the electrode layer is configured to have a single-layer on-cell (SLOC) structure.

14. A display apparatus, comprising the touch-control panel of claim 13.

15. The display apparatus of claim 14, wherein the display apparatus comprises at least one of a TV, a computer, a smart phone, or a tablet computer.

16. A method of forming an electrode layer, the method comprising:
patterning a transparent conductor layer along a plurality of columns to form a plurality of first electrode strips; and a plurality of second electrode strips interlacing with the plurality of first electrode strips and extending along a column direction;

wherein:
the plurality of first electrode strips and the plurality of second electrode strips have widths varying along the column direction to thereby realize complementary shapes such that light reflection from a first row region is similar to light reflection from a second, neighboring, row region to thereby reduce or eliminate light and dark stripes resulting from light reflection by the plurality of first and second electrode strips;

the patterning comprises etching to form two sides each of the plurality of first or second electrode strips as sloped side surfaces; and a slope angle between the sloped side surfaces and a bottom surface resulting from the etching is in a range of about 0°-30°.

* * * * *